United States Patent [19]

Arai et al.

[11] Patent Number: 4,977,473
[45] Date of Patent: Dec. 11, 1990

[54] DRUM ASSEMBLY IN MAGNETIC RECORDING/REPRODUCING APPARATUS AND MANUFACTURING METHOD THEREOF

[75] Inventors: Mitsuhiro Arai; Eiichi Tsuchiya; Tetsuo Ikeda, all of Yokohama, Japan

[73] Assignee: Victor Company of Japan, Ltd., Japan

[21] Appl. No.: 278,572

[22] Filed: Nov. 28, 1988

[30] Foreign Application Priority Data

Nov. 30, 1987 [JP] Japan ................................. 62-301774

[51] Int. Cl.$^5$ ...................... G11B 15/60; G11B 5/027
[52] U.S. Cl. ................................. 360/130.24; 360/84
[58] Field of Search ................... 360/130.24, 84–85, 360/107

[56] References Cited

U.S. PATENT DOCUMENTS 3,930,270 12/1975 Tanigawa et al. .
4,833,562 5/1989 Kochi ............................ 360/130.24

FOREIGN PATENT DOCUMENTS

| 0069499 | 1/1983 | European Pat. Off. . |
| 0154120 | 9/1985 | European Pat. Off. . |
| 3545062 | 7/1986 | Fed. Rep. of Germany . |
| 58-34708 | 3/1983 | Japan . |
| 63-46647 | 2/1988 | Japan . |
| 1-30051 | 1/1989 | Japan ............................ 360/130.24 |
| 2097168 | 10/1982 | United Kingdom . |
| 2149958 | 6/1985 | United Kingdom . |

OTHER PUBLICATIONS

"Television Technique" May 1987, vol. 35; pp. 26–32 by Kotaro Kawamura et al.

Primary Examiner—A. J. Heinz
Attorney, Agent, or Firm—Lowe, Price, Leblanc, Becker & Shur

[57] ABSTRACT

Improvement of a lower cylinder of a drum assembly for a helical scan type magnetic recording/reproducing apparatus, a magnetic tape being wrapped around the drum assembly in a predetermined angular range with respect to its own axis which is wider than a scanning angular range so as to have an additional tape-wrapping angular range on at least a tape-entry portion from which the tape starts to be wrapped around the drum assembly. The lower cylinder integrally has on its outer circumferential surface a tape-guiding portion for guiding the tape on wrapping it around the drum assembly, a tape-wrapping portion on which the magentic tape is wrapped along the tape-guiding portion in a direction substantially coincident with a direction of rotation of the upper cylinder and a protruding portion formed in the additional tape-wrapping angular range so as to be protruded by a predetermined amount with respect to the tape-wrapping portion. The protruding portion initially comes into contact with the tape to be entered onto the drum assembly and has a wedge-like shape in which its top is substantially directed in the tape-travelling direction. The protruding amount of the protruding portion with respect to the tape-wrapping portion being substantially equal to a protruding amount of the magnetic head from an upper cylinder of the drum assembly.

5 Claims, 3 Drawing Sheets

DRUM ASSEMBLY IN MAGNETIC RECORDING/REPRODUCING APPARATUS AND MANUFACTURING METHOD THEREOF

BACKGROUND OF THE INVENTION

The present invention relates to a guide drum assembly for use in helical scan type magnetic recording/reproducing apparatus and a manufacturing method thereof.

A helical scan type a magnetic recording/reproducing apparatus (i.e., video tape recorder) generally includes a guide drum assembly for signal recording/reproducing which comprises an upper cylinder adapted to be rotatable about its own axis and to have at its circumferential surface a plurality of magnetic heads and a lower cylinder arranged to be stationary with respect to a base of said apparatus and to have on its circumferential surface a lead portion for guiding a magnetic tape. The upper and lower cylinders are coaxially provided so that on recording and reproducing a magnetic tape is travelled therealong so as to be guided by the lead portion of the lower cylinder and to wrapped around the circumferential surface of the upper cylinder to be in contact relation thereto.

A serious problem arising in such a magnetic recording/reproducing apparatus is that the magnetic tape vibrates when the traveling tape comes into an entry-side of the guide drum assembly where the tape is struck by an entry-side head to contact therewith and further, as described in detail in the monthly magazine "Television Technique" (published on May 1987), when the traveling tape leaves an exit-side of the guide drum assembly where an exit-side head departs to lose contact with the tape, thereby causing a jitter to occur on reproduction. One possible solution for the tape vibration due to the separation from the exit-side head is to provide to the guide drum assembly a projection (so-called bulge), whose height is about 50 micrometers, so as to reduce a contact pressure due to a generated vacuum between the magnetic tape and the exit-side of the guide drum to allow smooth separation of the magnetic tape therefrom, as described in the above-mentioned monthly magazine. However, because of locational design limitations, difficulty is encountered to provide a similar projection for prevention of the tape vibration due to the striking contact with the entry-side head. Therefore, in order to prevent the magnetic tape from vibrating or coming into contact with the entry-side head, an arrangement of a lower cylinder, coaxially arranged with an upper cylinder 8, has been proposed as shown in FIG. 1, where a L-shaped member 5 having a projection 4 is fitted by means of a screw 6 in a cylinder body 3, the projection 4 protruding through an opening from the outer surface of the cylinder body 3 and the protruding amount thereof being adjusted by means of an adjusting screw 7 in a range between 5 to 10 micrometers from the outer surface. This arrangement requires a complex construction and an increase of the manufacturing cost.

SUMMARY OF THE INVENTION

It is therefore an object of the present invention to provide a guide drum assembly, particularly lower cylinder, for use in a magnetic recording/reproducing apparatus which can be constructed simply to considerably reduce the manufacturing cost and further to provide a manufacturing method thereof.

A constructional feature of the present invention for eliminating the above-mentioned problem is that, with a magnetic tape being wrapped around a drum assembly in a predetermined angular range with respect to its own axis which a predetermined angular range includes an additional angular range added to a standard scanning angular range necessary for recording and reproducing information according to an industry standard system format, the lower cylinder integrally has on its outer circumferential surface a tape-wrapping portion on which the magentic tape is wrapped in a direction generally along a direction of rotation of the upper cylinder and a protruding portion formed in the additional angular range so as to protrude by a predetermined amount from the outer circumferential surface of the tape-wrapping portion where the tape initially comes into contact with the tape to be entered onto the drum assembly, the protruding portion having a wedge-like shape in which its apex is substantially directed in the tape-travelling direction and the protruding amount of the protruding portion with respect to the surface of the tape-wrapping portion being substantially equal to a protruding amount of the magnetic head from an upper cylinder of the drum assembly.

In accordance with the present invention, there is provided a lower cylinder of a guide drum assembly for use in a helical scan type magnetic recording/reproducing apparatus, said guide drum assembly further including an upper cylinder having at least one magnetic head which is rotatable about its own axis and which is coaxially arranged with said lower cylinder, said magnetic head being arranged to protrude from a surface of a tape wrapping portion provided on the lower cylinder, a magnetic tape being enabled to be wrapped around said guide drum assembly in a predetermined angular range with respect to its own axis which is wider than a standard tape-wrapping angular range necessary for recording and reproducing information on and from said magnetic tape according to an industry standard system format by means of said magnetic head so as to have an additional tape-wrapping angular range on at least a tape-entry portion from which said magnetic tape starts to be wrapped around said guide drum assembly, said lower cylinder integrally having on its outer circumferential surface a tape-guiding portion for guiding said magnetic tape when said magnetic tape is wrapped around said guide drum assembly, said magnetic tape being wrapped over said tape-wrapping portion along said tape-guiding portion in a direction generally along a direction of rotation of said upper cylinder and a protruding portion formed in said additional tape-wrapping angular range so as to protrude by a predetermined amount with respect to a surface of said tape-wrapping portion, said magnetic tape initially coming into contact with protruding portion when the tape comes to enter into said guide drum assembly, said protruding portion having a wedge-like portion an apex of which is substantially directed in the direction of rotation of said upper cylinder and said protruding amount of said protruding portion with respect to the surface of said tape-wrapping portion being substantially equal to a protruding amount of said magnetic head from a surface of said tape wrapping portion.

In accordance with the present invention, there is further provided a method for manufacturing a lower cylinder of a guide drum assembly for use in a helical scan type magnetic recording/reproducing apparatus, said guide drum assembly further including an upper cylinder having at least one magnetic head which is rotatable about its own axis and which is coaxially arranged with said lower cylinder, said magnetic head being arranged to protrude from a surface of a tape wrapping portion provided on the lower cylinder, a magnetic tape being enabled to be wrapped around said guide drum assembly in a predetermined angular range with respect to its own axis which is wider than a standard scanning angular range necessary for recording and reproducing information on and from said magnetic tape according to an industry standard system format by means of said magnetic head so as to have an additional tape-wrapping angular range on at least a tape-entry portion from which said magnetic tape starts to be wrapped around said guide drum assembly, said method comprising the steps of: (a) preparing a cylindrically shaped body having a non-machined portion on its circumferential surface and an outer diameter of which is greater than that of said upper cylinder; (b) machining an upper portion of the circumferential surface of said cylindrically shaped body by a predetermined width from the top portion of said cylindrically shaped body in a direction of the axis thereof so as to form a machined portion having a first step between said machined portion and the non-machined portion, the machined portion having a first predetermined depth corresponding to said step therebetween; (c) machining said cylindrically shaped body over the machined portion and the non-machined portion thereof in the standard scanning angular range to form a tape-guiding portion, the width of said tape-guiding portion being substantially equal to the predetermined width of the machined portion to contact therewith at one end of the standard scanning angular range, said tape-guiding portion having a second predetermined depth so as to form a second step between the formed tape-guiding portion and the circumferential surface of said cylindrically shaped body so that a lower edge of said magnetic tape is guided along said second step, said second predetermined depth being greater than said first predetermined depth and the difference between said first and second predetermined depths being substantially equal to a protruding amount of said magnetic head from a surface of said guiding portion; and (d) cutting a portion of first machined portion in said additional tape-wrapping angular range so as to have a wedge-like portion, an apex of said wedge-like portion directing in a direction of rotation of said upper cylinder.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
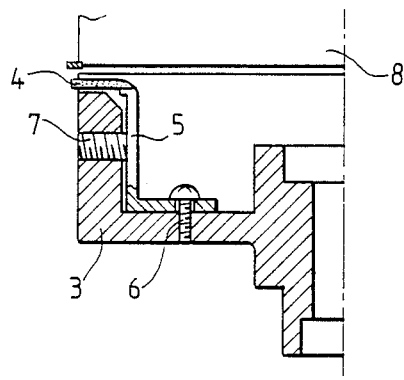
FIG. 1 is a cross-sectional view showing an arrangement of a conventional lower cylinder of a guide drum assembly.
Figure 2:
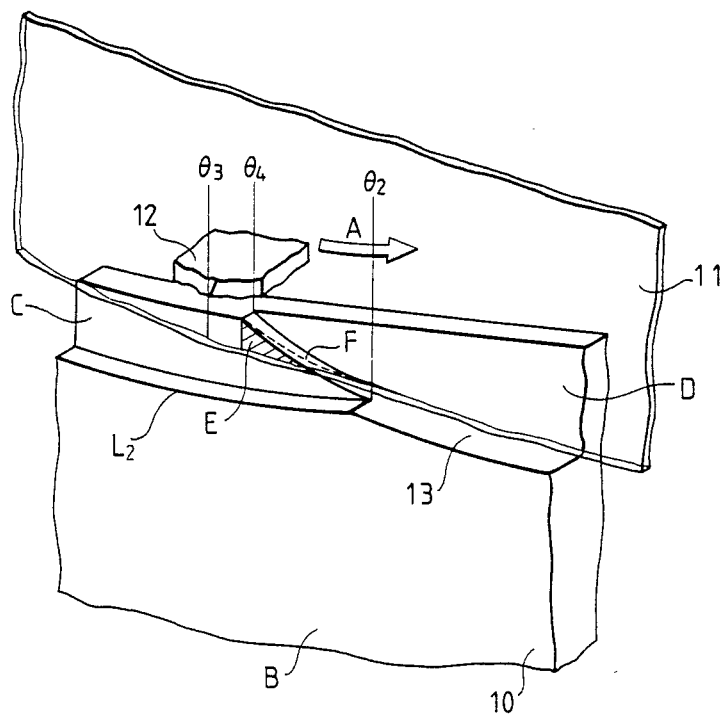
FIG. 2 is a perspective view partially showing a lower cylinder according to an embodiment of the present invention.
Figure 3:
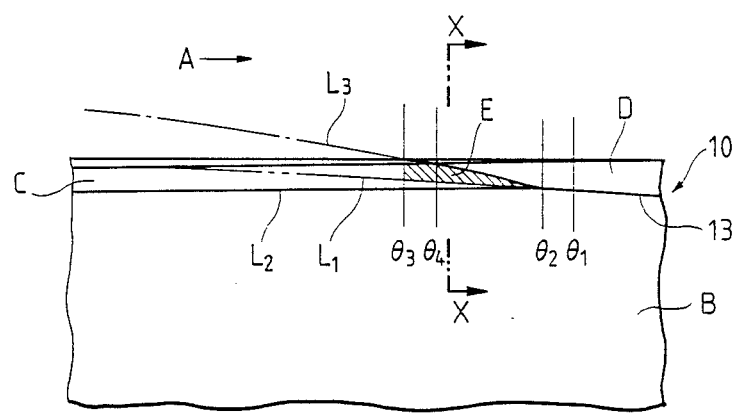
FIG. 3 is a side view of the FIG. 2 lower cylinder.
Figure 4:
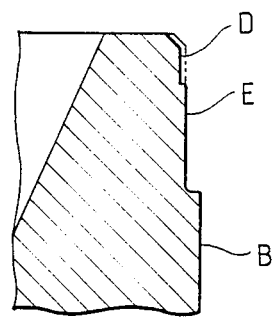
FIG. 4 is a cross-sectional view taken along a line X—X in FIG. 3.
Figure 5:
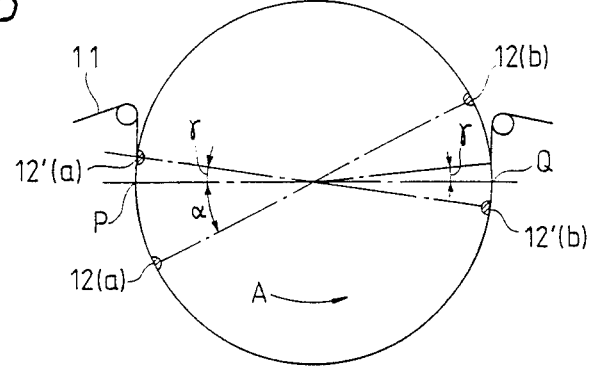
FIG. 5 is an illustration for describing a state that a magnetic tape is wrapped around a guide drum assembly.

Referring now to FIGS. 2 to 4, there is illustrated a lower cylinder section of a guide drum assembly in a recording/reproducing apparatus according to an embodiment of the present invention, FIG. 2 being perspective view partially showing the lower cylinder section thereof in relation to a magnetic tape wrapped around the guide drum assembly, FIG. 3 being a side view of the lower cylinder section and FIG. 4 being an enlarged cross-sectional view taken along line X—X in FIG. 3. In FIGS. 2 and 3, illustrated at numeral 10 is a lower cyclinder of a guide drum assembly which is fixedly secured to a base, not shown, of the magnetic recording/reproducing apparatus, where a magnetic head 12 is rotatable counterclockwise (in a direction indicated by an arrow A) and a magnetic tape 11 is adapted to travel along a tape-guiding ledge 13 (which will hereinafter be referred to as a lead) in the direction of the arrow A, the tape 11 being wrapped around the guide drum assembly as it travels so as to initially come into contact with an entry-side magnetic head 12 and to be separated from an exit-side magnetic head, not shown. Generally, the magnetic tape 11 is wrapped around the guide drum assembly by an angle (tape-scanning angle) with respect to the axis of the guide drum assembly which is necessary for recording and reproducing information on the magnetic tape 11 according to an industry standard format. Whereas, in this embodiment, the magnetic tape 11 is adapted to be wrapped therearound through a range of a predetermined angle which includes an additional angle, that is, the tape-wrapping angle is greater than a standard tape scanning angle. More specifically, as shown in FIG. 5 which is an illustration viewed from the upper side of the guide drum assembly, when recording and reproducing of information are effected in an angular range (for example 180°) between positions designated at characters P and Q, the magnetic tape 11 is additionally wrapped by angles $\gamma°$ for the tape-entering side and the tape-exiting side. In FIG. 5, references 12a and 12b respectively represent video heads and references 12'(a) and 12'(b) respectively designate audio heads. Here, if briefly giving a description in terms of the afore-mentioned tape vibration on coming into contact with the entry-side magnetic head (12'(a)), when the video head 12(a) is in the reproducing state and rotated by an angle $\alpha$ with respect to the position P in a direction indicated by an arrow A, the audio head 12'(a) approaches the magnetic tape 11 and then strikes it. The impact causes generation of the tape vibration to result in jitter in the reproduction.

Returning back to FIGS. 2 and 3, the magnetic tape 11 substantially enters at an angular position indicated by character $\theta_3$ toward the guide drum assembly with the lower edge thereof being a line indicated by reference L1 and the magnetic tape 11 initially comes into contact with a wedge-like protruding portion (shadowed portion) designated by character E and then travels along the lead 13 toward a tape-wrapping portion D, the magnetic head 12, rotating in the direction of the arrow A, comes into contact therewith at an angular position illustrated at character $\theta_1$. The tape-wrapping portion D has a circular surface and the diameter of which is substantially equal to a nominal guide drum diameter (62 mm for instance) of the industry standard system format. A diameter of the upper drum is also equal to the nominal guide drum diameter. The character B depicts a lower portion of the lower cylinder 10 which has the greatest diameter and character C represents an upper portion thereof. The wedge-like protruding portion E is provided between the portion C and the tape-wrapping portion D in the circumferential directions of the lower cylinder 10 so as to be consecutively coupled to the upper portion C and to be coupled to the tape-wrapping portion D in different diameter relation thereto. On the other hand, the lower portion B, wedge-like protruding portion E and tape-wrapping portion D are coupled stepwise to each other along the axis of the guide drum assembly as shown in FIG. 4 which is a cross-sectional view taken along a line X—X in FIG. 3. A shelf, or step, formed between the lower portion B and the tape-wrapping portion D acts as the lead 13 of the tape-entering side. The magnetic head 12 is protruded from the surface of the tape-wrapping portion D and the protruding amount of the magnetic head 12 is substantially equal to the difference in depth (in a direction normal to the axis of the lower cylinder 10) from the wedge-like protruding portion E to the tape-wrapping portion D. The wedge-like protruding portion E is positioned in the range of the entry-side additional angle $\gamma°$, i.e., between the angular positions $\theta1$ to $\theta3$, preferably between an angular position $\theta2$ and the angular position $\theta3$. The wedge-like protruding portion E is formed so that its top, i.e., apex, is generally directed in the direction of rotation of the magnetic head 12, that is, its width in the axial direction of the lower cylinder 10 is gradually decreased in the direction of the arrow A so as to depart from the top portion of the lower cylinder 10 and to smoothly and consecutively coupled to the lead 13. This arrangement of the wedge-like protruding portion E results in the fact that the magnetic tape 11 is gradually released from a full contact state with the wedge-like protruding portion E to zero, that is, the contact of the magnetic tape 11 with the wedge-like protruding portion E is gradually decreased toward the apex of the portion E, thereby allowing smooth and stable contact between the magnetic tape 11 and the magnetic head 12 to reduce a jitter produced in reproduction. Here, as an optional design, it is also appropriate to form the wedge-like protruding portion E so that its thickness with respect to the tape-wrapping portion D may gradually be decreased in a direction of the rotation of the upper cylinder as shown by a dotted line F in FIG. 2 to allow more smooth travelling of the magnetic tape 11 from the wedge-like protruding portion E to the tape-wrapping portion D.

Figure 6:
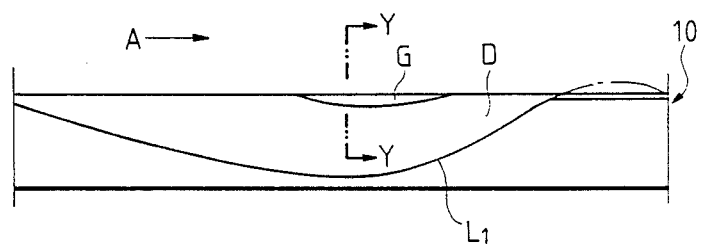
FIG. 6 is a side view showing the rear side of the FIG. 2 lower cylinder.
Figure 7:
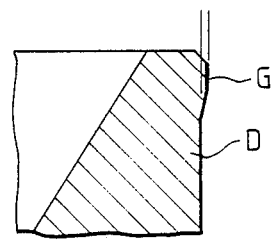
FIG. 7 is a cross-sectional view taken along a line Y—Y in FIG. 6.

FIGS. 6 and 7 show an arrangement of the tape-exit side of the lower cylinder 10 in which a projection G is provided at an upper portion of the lower cylinder in the tape-wrapping portion D. This projection G acts to insure tape separation from the guide drum assembly to reduce the tape vibration.

A description will be given hereinbelow in terms of manufacturing the above-mentioned lower cylinder 10 of the guide drum assembly.

First, prepared is a cylindrial base body whose diameter is substantially equal to that of the lower portion B of the lower cylinder 10. An upper portion of the cylindrical base body is cut circumferentially about the axis of the cylindrical base body to have a first predetermined width (a distance between the top portion of the lower cylinder 10 and a line L2 in FIG. 3) and a first predetermined depth with respect to the surface of the cylindrical base body to as to form the upper portion C of the lower cylinder 10, the first predetermined depth being determined so as to be aligned with an apex of the magnetic head 12 or taking into account a predetermined head protruding amount from the surface of the tape-wrapping portion D to be formed subsequently and further to allow forming the projection G in FIG. 6. Secondly, the upper portion thereof is further machined by a predetermined angular range (partially corresponding to the tape-wrapping angle) from a predetermined angular position ($\theta2$) having a second predetermined depth with respect to the surface of the cylindrical base body to as to form the tape-wrapping portion D having the aforementioned nominal guide drum diameter, thereby the difference between the first predetermined depth and the second predetermined depth being substantially equal to the protruding amount of the magnetic head 12 from the surface of the tape-wrapping portion D. The second predetermined depth is substantially larger than the protruding amount of the magnetic head 12 and large enough to hold the magnetic tape securely along the axis of the drum assembly. The machining for the tape-wrapping portion D is performed first along a line L1 corresponding to the lead 13 (FIG. 3) then is extended into the range between the angular positions $\theta2$ and $\theta4$ going along the line L3 so that the wedge-like portion E is formed where the angular position $\theta2$ is a point at which the line L3 intersects the line L1. When forming the tape-wrapping portion D, the machining is performed so that a portion corresponding to the projection G shown in FIG. 6 remains.

In other words, for construction of the lower cylinder 10 according to this embodiment, after first machining an upper portion of the circumferential surface of the cylindrical base body by a predetermined width from the top portion of the cylindrical base body in the direction of the axis thereof and by a first predetermined depth so as to form a step between the machined portion and the non-machined portion as it prepared, a tape-guiding path corresponding to the tape wrapping portion D is then laid out over the first machined portion and the non-machined portion of the cylindrical base body in the scanning angular range. The width of the tape-guiding path is substantially equal to the predetermined width of the machined portion to connect therewith at one end of the standard scanning angular range. Thereafter, the tape-guiding path is actually machined on the cylindrical base body to have a second predetermined depth so as to form a second step (lead 13) between the formed tape-guiding path and the circumferential surface of the cylindrical base body so that the lower edge portion of the magnetic tape 11 is guided along the second step. The second predetermined depth from the surface of the lower portion B is greater than the first predetermined depth and the difference between the first and second predetermined depths is substantially equal to a protruding amount of the magnetic head 12 from the surface of the tape-wrapping portion D. Finally, a portion of first machined portion in the additional angular range is machined so as to have a wedge-like configuration so that the top of the wedge-like portion directs in a direction of rotation of said upper cylinder. Here, preferably, the wedge-like portion is cut so that the top thereof is successively coupled to one end portion of the second step formed between the tape-guiding path and the circumferential surface of the cylindrical base body.

It should be understood that the foregoing relates to only preferred embodiments of the present invention, and that it is intended to cover all changes and modifications of the embodiments of the invention herein used for the purposes of the disclosures, which do not constitite departures from the spirit and scope of the invention.

What is claimed is:

1. A lower cylinder of a guide drum assembly for use in a helical scan type magnetic recording/reproducing apparatus, said guide drum assembly further including an upper cylinder having at least one magnetic head which is rotatable about its own axis and which is coaxially arranged with said lower cylinder, said magnetic head being arranged to protrude from a surface of a tape wrapping portion provided on the lower cylinder, a magnetic tape being enabled to be wrapped around said guide drum assembly in a predetermined angular range with respect to its own axis which is wider than a standard tape-wrapping angular range necessary for recording and reproducing information on and from said magnetic tape according to an industry standard system format by means of said magnetic head, thereby providing an additional tape wrapping angular range on a tape-entry portion from which said magnetic tape starts to be wrapped around said guide drum assembly, said lower cylinder integrally having on its outer circumferential surface a tape-guiding portion for guiding said magnetic tape when said magnetic tape is wrapped around said guide drum assembly, said magnetic tape being wrapped over said tape-wrapping portion along said tape guiding portion in a direction generally along a direction of rotation of said upper cylinder, a protruding portion being formed in said additional tape-wrapping angular range so as to protrude by a predetermined amount with respect to a surface of said tape-wrapping portion, so that said magnetic tape initially comes into contact with said protruding portion when the tape comes to enter into said guide drum assembly, said protruding portion including a wedge-like portion an apex of which is substantially directed in the direction of rotation of said upper cylinder and said protruding amount of said protruding portion with respect to the surface of said tape-wrapping portion being substantially equal to a protruding amount of said magnetic head from a surface of said tape wrapping portion, wherein said protruding amount of said wedge-like protruding portion is gradually made thinner in the direction of rotation of said upper cylinder so that the protruding amount of a top thereof becomes substantially zero with respect to said surface of tape-wrapping portion.

2. A lower cylinder as claimed in claim 1, wherein said tape-wrapping portion is recessed to form a step of said tape-guiding portion so as to serve as tape-guiding means.

3. A lower cylinder as claimed in claim 2, wherein an upper surface of said wedge-like portion is formed to depart from the top of said lower cylinder to advance in the direction of rotation of said upper cylinder so that said upper surface thereof is successively coupled to said step of said tape-guiding portion.

4. A method for manufacturing a lower cylinder of a guide drum assembly for use in a helical scan type magnetic recording/reproducing apparatus, said guide drum assembly further including an upper cylinder having at least one magnetic head which is rotatable about its own axis and which is coaxially arranged with said lower cylinder, said magnetic head being arranged to protrude from a surface of a tape wrapping portion provided in the lower cylinder, a magnetic tape being enabled to be wrapped around said guide drum assembly in a predetermined angular range with respect to its own axis which is wider than a standard scanning angular range necessary for recording and reproducing information on and from said magnetic tape according to an industry standard system format by means of said magnetic head so as to have an additional tape-wrapping angular range on a tape-entry portion from which said magnetic tape starts to be wrapped around said guide drum assembly, said method comprising the steps of:

(a) preparing a cylindrical shaped body having a non-machined portion on its circumferential surface and an outer diameter of which is greater than that of said cylinder;

(b) machining an upper portion of the circumferential surface of said cylindrical shaped body by a predetermined width from the top portion of said cylindrically shaped body in a direction of the axis thereof so as to form a machined portion having a first step between said machined portion and the non-machined portion, the machined portion having a first predetermined depth corresponding to said therebetween;

(c) machining said cylindrically shaped body over the machined portion and the non-machined portion thereof in the standard scanning angular range to form a tape-guiding portion, the width of said tape-guiding portion being substantially equal to the predetermined width of the machined portion to contact therewith at one end of the standard scanning angular range, said tape-guiding portion having a second predetermined depth so as to form a second step between the formed tape-guiding portion and the circumferential surface of said cylindrically shaped body so that a lower edge of said magnetic tape is guided along said second step, said second predetermined depth being greater that said first predetermined depth and the difference between said first and second predetermined depths being substantially equal to a protruding amount of said magnetic head from a surface of said guiding portion;

(d) cutting a portion of first machined portion in said additional tape-wrapping angular range so as to have a wedge-like portion, so that an apex of said wedge-like portion directs in a direction of rotation of said upper cylinder; and (e) machining said wedge-like portion so that its protruding height is gradually made thinner in the direction of rotation of said upper cylinder so as to become zero with respect to said tape-guiding portion.

5. A method as claimed in claim 4, wherein the step (d) comprising a step of cutting said wedge-like portion so that the apex thereof is consecutively coupled to one end portion of said second step formed between said tape-guiding portion and the circumferential surface of said cylindrically shaped body.

* * * * *